United States Patent
Claudatos et al.

(10) Patent No.: US 8,079,091 B2
(45) Date of Patent: Dec. 13, 2011

(54) COMPLIANCE PROCESSING OF RIGHTS MANAGED DATA

(75) Inventors: Christopher Hercules Claudatos, San Jose, CA (US); William Andruss, Minneapolis, MN (US); Bruce Leetch, Mason, OH (US); Jeffrey K. Porter, Springboro, OH (US)

(73) Assignee: EMC Corporation, Hopkinton, MA (US)

( * ) Notice: Subject to any disclaimer, the term of this patent is extended or adjusted under 35 U.S.C. 154(b) by 867 days.

(21) Appl. No.: 11/506,397

(22) Filed: Aug. 17, 2006

(65) Prior Publication Data

US 2007/0056046 A1    Mar. 8, 2007

Related U.S. Application Data

(60) Provisional application No. 60/709,466, filed on Aug. 18, 2005.

(51) Int. Cl.
*G06F 7/04* (2006.01)
*G06F 21/00* (2006.01)
*G06N 5/04* (2006.01)
*G06F 11/30* (2006.01)
*H04L 9/32* (2006.01)

(52) U.S. Cl. .......... 726/28; 726/27; 705/56; 705/57; 705/59

(58) Field of Classification Search .............. 726/28, 726/27; 705/26, 57, 59
See application file for complete search history.

(56) References Cited

U.S. PATENT DOCUMENTS

| | | | |
|---|---|---|---|
| 6,611,812 B2 * | 8/2003 | Hurtado et al. | 705/26 |
| 6,636,585 B2 | 10/2003 | Salzberg et al. | |
| 6,721,424 B1 | 4/2004 | Radatti | |
| 7,188,087 B1 * | 3/2007 | Goldstein | 705/57 |
| 2006/0005254 A1 * | 1/2006 | Ross | 726/27 |

FOREIGN PATENT DOCUMENTS

WO    WO 2006060822 A2 *    6/2006

OTHER PUBLICATIONS

Götze, J.; Fleuren, T.; Müller P.; Schwantzer, S.; "License4Grid: Adopting DRM for Licensed Content in Grid Environments"; Web Services (ECOWS), 2010 IEEE 8th European Conference on Digital Object Identifier: 10.1109/ECOWS.2010.25 Publication Year: Sep. 2010 , pp. 19-26.*

* cited by examiner

*Primary Examiner* — Eleni Shiferaw
*Assistant Examiner* — Courtney Fields
(74) *Attorney, Agent, or Firm* — Van Pelt & Yi & James LLP

(57) ABSTRACT

Performing compliance processing is disclosed. An indication is received that compliance processing is to be performed with respect to content that is subject to an access restriction that would prevent the compliance processing from being performed if the content were not able to be accessed without the restriction. It is ensured that the content can be accessed without the restriction to perform the compliance processing.

20 Claims, 6 Drawing Sheets

COMPLIANCE PROCESSING OF RIGHTS MANAGED DATA

CROSS REFERENCE TO OTHER APPLICATIONS

This application claims priority to U.S. Provisional Patent Application No. 60/709,466 entitled Digital Rights Management filed Aug. 18, 2005 which is incorporated herein by reference for all purposes.

BACKGROUND OF THE INVENTION

Rights management systems, such as digital rights management (DRM) systems, have been used to deliver content to only specified recipients and/or with specific usage rights (e.g., read only) and/or for a specific period of time. In some cases, such systems have been used to generate an audit trail of who accessed content in what manner and when. Compliance systems have been provided to ensure that content communicated electronically, e.g., sent to/from a user associated with an enterprise or other network with which the compliance system is associated, complies with applicable regulation, rule, and/or policy; to ensure that such content does not contain malicious code, such as a virus, or otherwise pose a computer security threat; and/or to provide and/or manage access to stored content, e.g., by providing a searchable index and/or database of such content and/or managing the access and storage of content through an information lifecycle. Some such systems, e.g., information lifecycle management (ILM) systems, provide the ability to store and retrieve content on demand as needed for a specified period of time and/or for the content to be migrated to different levels of storage and/or ultimately verifiably deleted depending on the need to access and/or retain the content through one or more lifecycle phases. Companies and other entities are using various rights management (RM) and encryption systems to secure and make private the transport and use of documents, files, communications, and other content. Companies and other entities are also using content inspection technologies in order to enforce compliance with various government, regulatory, and internal restrictions. For example, stock brokerages are under significant industry and government regulation with regard to the type, content, and form of communication with their customers. The brokerages must monitor all communications with customers and be able to quickly and accurately retrieve copies of archived communications on demand.

Often a compliance monitoring system is rendered useless when a company receives content which is controlled by a RM system. The compliance system cannot analyze the content due to access restrictions placed on the content by the RM system. For example, content that has been encrypted by the RM system is unintelligible to the compliance monitoring system if the content cannot be decrypted. Consequently, RM systems can prevent companies from controlling, managing, and/or providing access to content, which in some cases the company is compelled by law to be able to retrieve and produce. Therefore there exists a need for a better way to perform compliance processing with respect to rights managed content.

BRIEF DESCRIPTION OF THE DRAWINGS

Various embodiments of the invention are disclosed in the following detailed description and the accompanying drawings.

DETAILED DESCRIPTION

Figure 1:
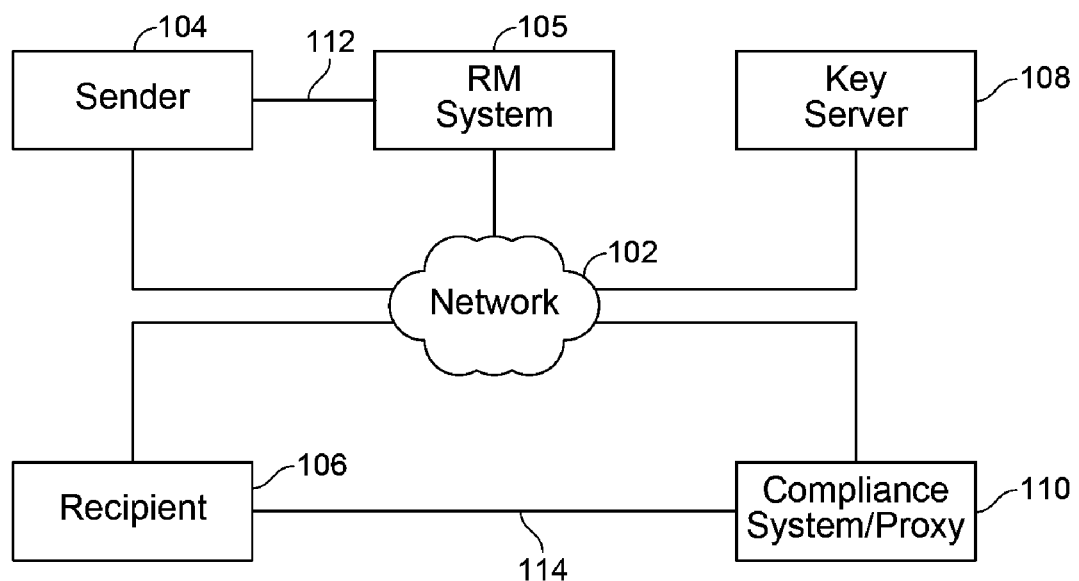
FIG. 1 is a diagram illustrating an embodiment of a compliance processing environment.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Compliance processing is disclosed. In some embodiments, compliance processing is performed on content subject to an access restriction by ensuring the content can be accessed without the restriction to perform the compliance processing. In some embodiments, a protocol is established between a sending entity using a rights management system and a receiving entity using a compliance system to allow the receiving entity to control, manage, index, search, archive, retrieve, display/render, and/or scan (e.g., for viruses/malware) received content, yet still allow access of the received content by an end-user recipient and/or others to be restricted as desired by the sender. In some embodiments, compliance processing includes performing antivirus and/or malware scanning.

In some cases, a sender may wish to allow a recipient other than an end user of the content, e.g., a compliance process or system associated with the end-user recipient, to be able to freely archive a restriction-free copy (e.g., clear text content) of the communicated content but retain control over a copy that the end-user recipient receives. The restriction-free copy is indexed and scanned for restricted content, and stored in an archive under control of the recipient compliance system. The end-user recipient would in some embodiments receive a copy of the content that is fully controlled by the sender's RM system. This allows the sender to retain persistent and dynamic control over how the end-user recipient uses the sent content since only the recipient's compliance system has permanent unrestricted access to the sent content. In some embodiments, a key server node manages access restrictions to the content for both the sender and the recipient. In some embodiments, access restrictions would be enforced with respect to the end-user recipient by the compliance system, acting on behalf of the RM system.

In some embodiments, compliance processing includes performing single instance store. When at least a portion of several files contain the same content, single instance storage avoids duplicate storage of the same content by using references to a single stored copy of the same content. However when content is encrypted, it is difficult or impossible to analyze files to determine if any content portion is duplicated. By ensuring the content can be accessed without access restrictions to perform single instance store analysis, maximum single instance store efficiency is achieved.

FIG. 1 is a diagram illustrating an embodiment of a compliance processing environment. Network 102 connects sender 104, RM system 105, key server 108, recipient 106, and compliance server/proxy 110. Network 102 comprises a public or private network and/or combination thereof, for example an Ethernet, serial/parallel bus, intranet, Internet, NAS, SAN, LAN, WAN, and other forms of connecting multiple systems and/or groups of systems together. Sender 104 desires to send content to recipient 106. Access to the content sent by sender 104 is managed by RM system 105. For example, whenever recipient 106 access the content, recipient 106 must use a permission granted by RM system 105, as evidenced for example by providing a password, access key, and/or other data provided and/or recognized by RM system 105. Sender 104 communicates with RM system 105 through network 102 and/or through an optional direct connection 112. The content received by recipient 106 is monitored by compliance server/proxy 110. In some cases, recipient 106 is not allowed to access any communicated content that has not been verified by compliance server/proxy 110. Recipient 106 communicates with compliance server 110 through network 102 and/or through an optional direct connection 114. In some embodiments, not shown in FIG. 1, compliance server/proxy 110 is located in and/or associated with a security system, such as a firewall, located in a communication path between network 102 and recipient 106, thereby putting it in a position to determine whether electronic communications sent to recipient 106 via network 102 should be permitted or blocked. In some embodiments, a sender such as sender 104 desiring to send an electronic communication to recipient 106 via network 102 first sends the communication to compliance server/proxy 110, which determines whether to forward the communication to recipient 106 (e.g., via network 102 or direct connection 114), e.g., based on compliance process performed with respect to the communication. In the example shown in FIG. 1, key server 108 negotiates keys for accessing the content sent by sender 104 to recipient 106. In the example shown, by keeping access keys at a node (108) trusted and accessible by both the RM system 105 and the compliance system 110, interests of both the systems can be guaranteed to be met. In various embodiments, key server 108 is optional. In some embodiments, RM system 105 provides one or more keys directly to compliance server/proxy 110 to enable compliance server/proxy 110 to access, for purposes of performing compliance processing, content sent by sender 104 to recipient 106 subject to access restrictions (e.g., encrypted).

Figure 2:
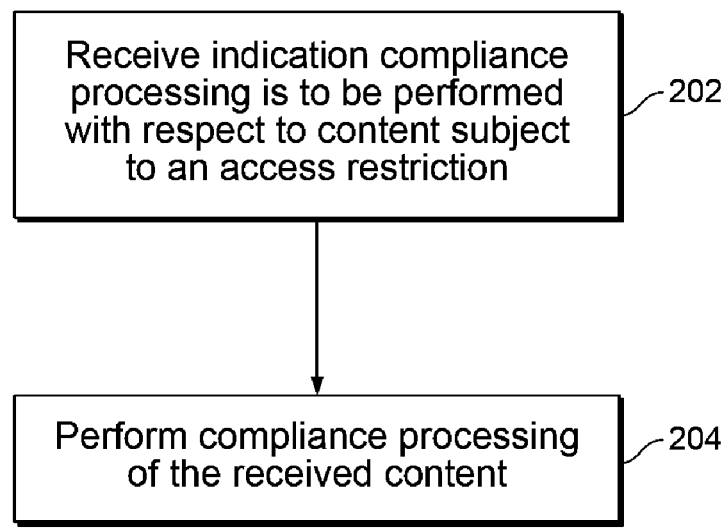
FIG. 2 is a flowchart illustrating an embodiment of a process for performing compliance processing.

FIG. 2 is a flowchart illustrating an embodiment of a process for performing compliance processing. This process may be implemented on a compliance system and/or a proxy. The proxy receives and forwards content for compliance processing. The compliance system and the proxy may be the same system. At 202, an indication is received that compliance processing is to be performed with respect to content subject to an access restriction. The content is received from a sender that has placed an access restriction on the content. For example, the content is encrypted so that the content can only be accessed by an authorized entity for an authorized use (e.g., read only). The access restriction may include any software or hardware restriction, such as a rights management restriction, that inhibits freely accessing and/or using the content.

In some embodiments, a sender sends the content and one or more access restriction rules to be enforced on an end-user recipient of the content. The content and the rules, in some embodiments, is sent in Extensible Markup Language (XML) format. In various embodiments, the format is proprietary, published, negotiated in a machine-to-machine negotiation between a rights management system associated with the sender and a compliance system associated with the recipient, and/or standards-based. Prior to reaching the end-user recipient, the content and access rules are received at a compliance system/proxy. The compliance system/proxy in some embodiments receives the content in a form understandable by the compliance system/proxy. Examples of content in a form understandable by the compliance system/proxy include an unencrypted form (e.g., clear text) or an encrypted form that the compliance system/proxy is able to decrypt for compliance processing, e.g., because an access key has been provided by the sender and/or RM system either directly to the compliance system or made available to the compliance system via a third party, such as key server 108 in the example shown in FIG. 1. In some embodiments, the sender of the content trusts the recipient's compliance system/proxy to forward a restricted version of the content to the intended end-user recipient of the content.

In some embodiments, the indication in 202 is received prior to allowing the end-user recipient of the content to receive/access/use the content. In some embodiments, the content is associated with a key that can be used by the compliance system/proxy to obtain an access restriction free version of the content for compliance processing. In some embodiments, the content is associated with a plurality of access keys. For example, one key can be used by a compliance system/proxy to render an access restriction free version of the content while another key can be used by the end-user recipient of the content to render the content in an access restricted format controlled by the sender of the content and/or an RM system associated with the sender. In some embodiments, the sender sends two versions of the content. One version with one or more access restrictions is sent to the end-user recipient, and another version that can be accessed for compliance processing is sent to the compliance system/proxy. The end-user recipient cannot access the access restricted version until a compliance system has verified its version and/or verified the two versions contain the same content. For example, the end-user access key is not provided and/or not made valid/recognized until an indication has been received from the compliance system that access by the end user, subject to one or more access restrictions, is permitted.

At 204, compliance processing is performed on the received content. Compliance processing includes ensuring the content complies one or more regulations, rules, and/or policies. For example, the content is analyzed, indexed, archive, rendered, analyzed for single instance store, and/or scanned for viruses/malware. In some embodiments, if the content is determined to be compliant, the intended end-user recipient of the content is allowed received/access/use the content under access restrictions specified by the sender of the content. In various embodiments the access restrictions on the content are enforced by the sender (or an associated RM system); a compliance system; and/or one or the other of the sender (or associated RM system) and the compliance system, depending on the circumstances.

Figure 3:
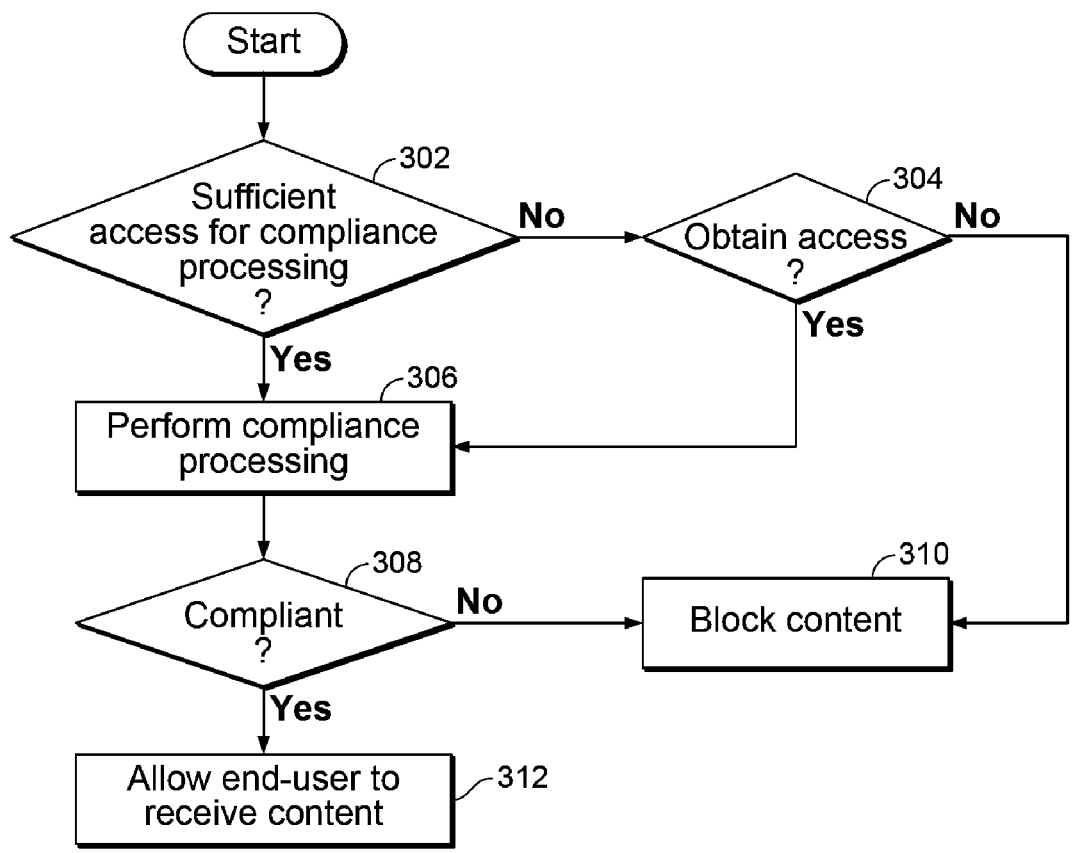
FIG. 3 is a flowchart illustrating an embodiment of a process for performing compliance processing.

FIG. 3 is a flowchart illustrating an embodiment of a process for performing compliance processing. In some embodiments, the process of FIG. 3 is included in 204 of FIG. 2. At 302, it is determined whether content received from a sender is accessible to the extent required for compliance processing. In some cases, it is to the benefit of an entity to reject received content that cannot be analyzed for compliance processing. In some embodiments, determining whether the content is accessible to the extent required for compliance processing includes determining one or more of the following: whether the content is encrypted, whether the content is controlled by rights management, whether the content is of a known type (e.g., associated with acceptable sender identifier, sender domain, time, and/or data size), whether the content is a restricted type (e.g., associated with not acceptable sender identifier, sender domain, time, and/or data size), whether the sender of the content negotiates access to the content for compliance processing, whether a specified access key can be used to by pass an access restriction of the content, and whether an access restriction of the content can be passed for compliance processing currently and/or in the future, e.g., throughout an associated information lifecycle of the content. In some embodiments, determining whether access to the content is restricted includes performing one or more of the following: examining a header associated with the content, measuring randomness of the data in the content to determine whether the content is encrypted, analyzing a profile of the content, attempting to open the content with a viewer or other software associated with the content type, and performing one or more other various analysis tests.

If at 302 the content is determined to be accessible to the extent required to perform compliance processing, at 306 compliance processing is performed on the content. Compliance processing includes accessing the document to verify the content complies one or more various regulations, rules, and/or policies. If at 308 it is determined the content is not compliant, the content is blocked at 310. Blocking the content includes not allowing the intended end-user recipient of the content to receive, access, and/or use the content. If at 308 it is determined the content is compliant, the intended end-user recipient is allowed to receive, access, and/or use the content at 312.

If at 302 the content is determined to not be accessible to the extent required to perform compliance processing, at 304 it is determined whether access to the restricted content can be obtained. For example, in some embodiments an access key that can be used to decrypt the content is requested from a key server. In some embodiments, access to the content is negotiated with the sender of the content. In some embodiments, the negotiation is an inter-machine negotiation without human intervention. In some embodiments, at 304 it is determined whether a previously obtained access key can be used to access the restricted content. If at 304 access to the content is obtained, compliance processing is performed at 306. Otherwise, at 310, the content is blocked.

Figure 4:
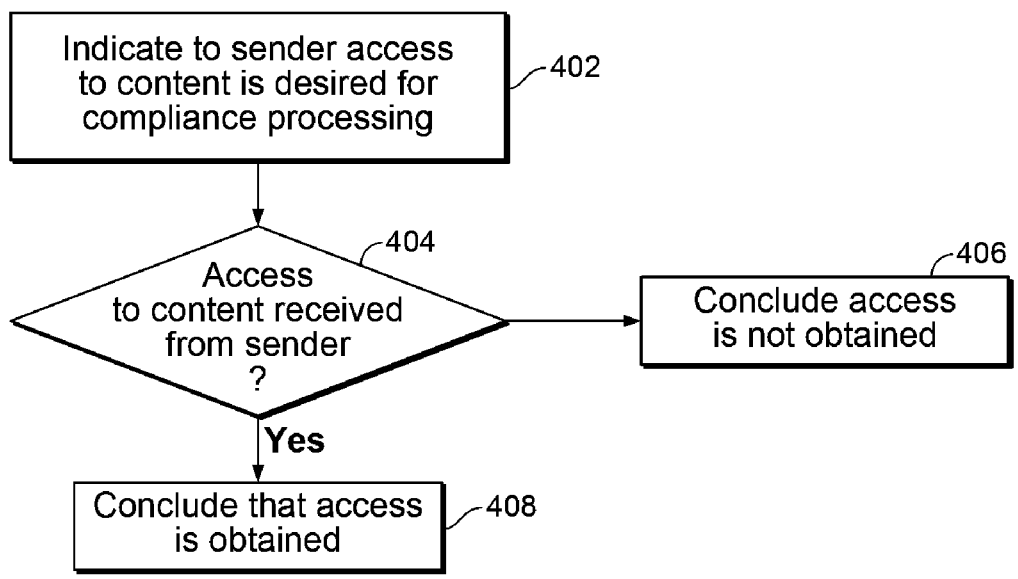
FIG. 4 is a flowchart illustrating an embodiment of a process for negotiating access to an access restricted content.

FIG. 4 is a flowchart illustrating an embodiment of a process for negotiating access to an access restricted content. In some embodiments, the process of FIG. 4 is included in 304 of FIG. 3. In some embodiments, the process of FIG. 4 is implemented on a compliance system. At 402, it is indicated to a sender of the access restricted content, or in some embodiments to an RM or other system other than the sender that is configured to enforce the access restriction, that access to the content is desired for compliance processing. In some embodiments, the indication includes a request for an access key that can be used to obtain the content in a form without any access restrictions and/or in a form in which the content is accessible at least to a degree and/or for a period required to perform compliance process.

If it is determined 404 that access to the content has been received from the sender, it is concluded at 408 that access to the content is obtained (see, e.g., 304 of FIG. 3). If at 404, access to the content is not granted/received from the sender, it is concluded at 408 that access to the content is not obtained. In various embodiments, the process of FIG. 4 is associated with inter-machine negotiation without human intervention. For example an access right is negotiated between a compliance system/proxy and a rights management system. In some embodiments, the access to the content is received at 404 in the form of an unrestricted copy of the content, received along with one or more access restriction rules to be enforced, e.g., by a compliance system on behalf of the sender/RM system, with respect to an end-user recipient of the content. For example, if the inter-machine negotiation fails, i.e., the sender/RM system cannot or will not agree to provide an access key to the compliance node, the compliance node asks (e.g., via a machine-to-machine communication without human intervention) to receive the content in a restriction free form and promises to enforce the access restriction with respect to end-users. If the sender/RM system refuses or fails to respond to the request to receive an unrestricted copy and enforce the access restriction(s) on behalf of the sender/RM system, it is concluded access cannot be obtained (406). In some embodiments, access to the content received is or may be determined at 404 to have been received if an access key and/or an acknowledgement from the sender that future content will be sent in a form that can be accessed by the access key is/are received. In various embodiments, the key is one or more of the following types of access keys: a temporal specific key that can be used to access content for a specific period of time or a specific elapsed period of time from when the content was created or when the content was first accessed; a recipient ID specific key that can be used to access content that is sent to a specific individual, group of individuals, and/or domains; a sender ID specific key that can be used to access content this is sent from a specific individual, group of individuals, and/or domains; a use count specific key that can be used to access content for a specified number of times; a content type specific key that can be used to access content of only a specified type; and an unrestricted key can be used to un-restrictively access content associated with the key. In various embodiments, the access key is a decryption key. In some embodiments, the access key is a master key. For example, all keys generated for content encryption/decryption are generated in a manner as to permit decryption by the master key even if one or more different key(s) is/are provided and/or used by one or more end-user recipients to decrypt content received by them. The master key is used by the compliance system and individual keys are used by individual senders/recipients—i.e., the master key and associated individual keys have a hierarchical relationship, such that the master key can access content accessible using any one or more of the individual keys.

Figure 5:
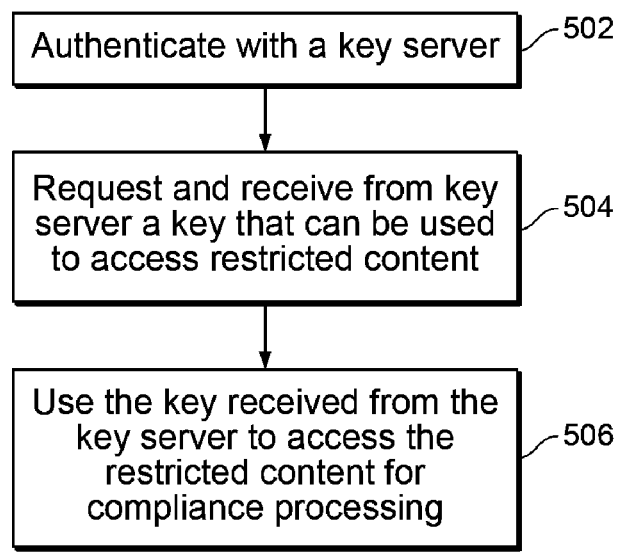
FIG. 5 is a flowchart illustrating an embodiment of a process for obtaining an access key from a key server.

FIG. 5 is a flowchart illustrating an embodiment of a process for obtaining an access key from a key server. In some embodiments, the process of FIG. 5 is included in 304 and/or 306 of FIG. 3. For example, at 304, an access key is requested from the key server to determine if access restricted content can be accessed for compliance processing, and/or at 306, an access key is requested from the key server to decrypt and access the content in performing compliance processing. At 504, authentication is established with the key server. The authentication verifies the identity of the entity desiring an access key. In various embodiments, the authentication can be established using certificates or any other authentication scheme.

At 504, a key that can be used to access the restricted content is requested from the key server and received. Requesting the key may include identifying information associated with the content to be decrypted, including one or more the following: a sender of the content, a receiver of the content, a type of the content, an attribute of the content, and an identifier of the content. At 506, the key received from the key server is used to access the restricted content for compliance processing. In various embodiments, the access key is one or more of the previously mentioned types of access keys. In some cases, the request for the key may be denied by the key server. If the request is denied, the compliance system of the restricted content recipient may deny the restricted content from being received by the end-user recipient. In some embodiments, a sender authenticates with the key server to obtain an encryption key to be used to encrypt the content for access restriction. The key server provides an encryption key selected such that the key server can ensure the compliance system will or could be provided access, e.g., by providing an encryption key selected such that a master key provided previously to the compliance system would be usable to decrypt content encrypted using the encryption key provided to the sender, or by remembering what encryption key was provided so that an associated access key could be provided by the key server, if requested by an authorized entity such as a known, trusted, and/or duly authenticated compliance system.

Figure 6:
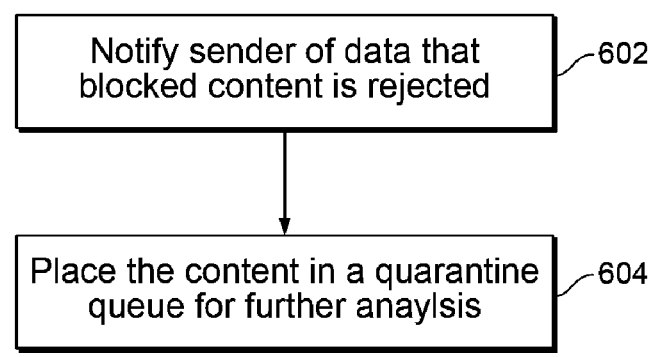
FIG. 6 is a flowchart illustrating an embodiment of a process for blocking content.

FIG. 6 is a flowchart illustrating an embodiment of a process for blocking content. In some embodiments, the process of FIG. 6 is included in 310 of FIG. 3. The blocked content is associated with content sent from a sender to an intended end-user recipient, wherein the content is blocked because the content cannot be analyzed for compliance and/or because the content is not compliant. At 602, the sender of the blocked content is notified that the content is rejected/blocked. In some embodiments, the sender of the content is notified of the reason for the rejection. For example, no access restricted content may be accepted by the content recipient's compliance system unless an arrangement is made to provide to a compliance system or node to the extent required to perform compliance processing. At 604, the content is placed in a quarantine queue for further analysis. In some embodiments, a human reviewer analyzes the content in the quarantine queue for further analysis and/or intervention, e.g., to allow a human to contact a counterpart associated with the sender and/or the sender's RM system, to attempt to gain access for compliance processing, or to learn how to handle (i.e., perform required compliance processing, and/or gain access required to do so) a previously unknown restriction, content format, protocol, sender, RM system, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing compliance processing, comprising:

receiving an indication that compliance processing is to be performed with respect to content that is subject to an access restriction that would prevent the compliance processing from being performed if the content were not able to be accessed without the access restriction; and using a processor to process the content to ensure the content can be accessed without the access restriction to perform the compliance processing, wherein using the processor to ensure the content can be accessed without the access restriction still allows the access restriction to restrict the end-user recipient from accessing the content if the access restriction restricts the end-user recipient, wherein ensuring the content can be accessed without the access restriction to perform the compliance processing includes performing an at least partly automated negotiation between a first entity associated with the access restriction and a second entity associated with the compliance processing to obtain from the first entity access to the content by the second entity to enable the second entity to perform the compliance processing, and wherein the compliance processing could not be performed by the second entity without the access obtained through negotiation with the first entity.

2. A method as recited in claim 1, wherein the first entity comprises a rights management system and the second entity comprises a compliance system.

3. A method as recited in claim 1, wherein ensuring the content can be accessed without the access restriction to perform the compliance processing includes agreeing to enforce the access restriction with respect to the end-user recipient of the content.

4. A method as recited in claim 1, wherein ensuring the content can be accessed without the access restriction to perform the compliance processing includes receiving a version of the content without the access restriction.

5. A method as recited in claim 4, wherein the version comprises one of at least two versions of the content sent by a sender of the content, and the sender sends the content with the access restriction to the end-user recipient.

6. A method as recited in claim 4, wherein ensuring the content can be accessed without the access restriction to perform the compliance processing further includes receiving one or more rules for accessing the content to be enforced with respect to the end-user recipient of the content, and enforcing the rules with respect to a forwarded version of the content sent to the end-user recipient.

7. A method as recited in claim 1, wherein the indication is received prior to allowing the end-user recipient of the content to receive, access, or use the content.

8. A method as recited in claim 7, wherein the end user is allowed to receive, access, or use the content when the content is determined to be compliant.

9. A method as recited in claim 1, wherein the content is associated with a plurality of access keys, and at least one of the access keys can be used by a compliance system to access the content without the access restriction and another one of the keys can be used by the end-user recipient of the content to access the content subject to the access restriction.

10. A method as recited in claim 1, wherein ensuring the content can be accessed without the access restriction to perform the compliance processing includes determining whether the content can be accessed without the access restriction to perform the compliance processing.

11. A method as recited in claim 10, wherein if it is determined the content cannot be accessed without the access restriction, the content is blocked.

12. A method as recited in claim 10, wherein determining whether the content can be accessed without the access restriction to perform the compliance processing includes determining one or more of the following: whether the content is encrypted, whether the content is controlled by rights management, whether the content is of a known type, whether the content is a restricted type, whether the sender of the content negotiates access to the content for compliance processing, whether a specified access key can be used to by pass an access restriction of the content, and whether an access restriction of the content can be passed for compliance processing.

13. A method as recited in claim 10, wherein determining whether the content can be accessed without the access restriction to perform the compliance processing includes performing one or more of the following: examining a header associated with the content, measuring randomness of the data in the content to determine whether the content is encrypted, and analyzing a profile of the content.

14. A method as recited in claim 1, wherein ensuring the content can be accessed without the access restriction to perform the compliance processing includes determining whether a previously received access key can be used to access the content.

15. A method as recited in claim 1, wherein ensuring the content can be accessed without the access restriction to perform the compliance processing includes obtaining from a key server an access key that can be used to pass the access restriction.

16. A method as recited in claim 15, wherein a sender of the content uses an encryption key obtained from the key server to encrypt the content for enforcement of the access restriction.

17. A method as recited in claim 1, wherein the access restriction specifies one or more of the following: one or more users that can access the content, how the content can be used, and when the content can be accessed.

18. A method as recited in claim 1, wherein the compliance processing includes performing one or more of the following: controlling the content, indexing the content, searching the content, archiving the content, retrieving the content, displaying the content, rendering the content, analyzing the content, scanning the content, analyzing the content to perform single instance store, analyzing the content for a virus or a malware, and verifying the content complies with one or more rules or regulatory restrictions.

19. A system for performing compliance processing, comprising:
   a communication interface configured to receive an indication that compliance processing is to be performed with respect to content that is subject to an access restriction that would prevent the compliance processing from being performed if the content were not able to be accessed without the access restriction; and
   a processor configured to process the content to ensure the content can be accessed without the access restriction to perform the compliance processing, wherein ensuring the content can be accessed without the access restriction still allows the access restriction to restrict the end-user recipient from accessing the content if the access restriction restricts the end-user recipient, wherein ensuring the content can be accessed without the access restriction to perform the compliance processing includes performing an at least partly automated negotiation between a first entity associated with the access restriction and a second entity associated with the compliance processing to obtain from the first entity access to the content by the second entity to enable the second entity to perform the compliance processing, and wherein the compliance processing could not be performed by the second entity without the access obtained through negotiation with the first entity.

20. A computer program product for performing compliance processing, the computer program product being embodied in a non-transitory computer readable medium and comprising computer instructions for:
   receiving an indication that compliance processing is to be performed with respect to content that is subject to an access restriction that would prevent the compliance processing from being performed if the content were not able to be accessed without the access restriction; and
   processing the content to ensure the content can be accessed without the access restriction to perform the compliance processing, wherein ensuring the content can be accessed without the access restriction still allows the access restriction to restrict the end-user recipient from accessing the content if the access restriction restricts the end-user recipient, wherein ensuring the content can be accessed without the access restriction to perform the compliance processing includes performing an at least partly automated negotiation between a first entity associated with the access restriction and a second entity associated with the compliance processing to obtain from the first entity access to the content by the second entity to enable the second entity to perform the compliance processing, and wherein the compliance processing could not be performed by the second entity without the access obtained through negotiation with the first entity.

* * * * *